(12) United States Patent
Porter

(10) Patent No.: US 6,843,954 B2
(45) Date of Patent: Jan. 18, 2005

(54) INJECTION MOLDING TECHNIQUES UTILIZING FLUID CHANNELS

(75) Inventor: Marshall Ray Porter, Oakdale, IL (US)

(73) Assignee: Conix Corporation, Dearborn, MI (US)

( * ) Notice: Subject to any disclaimer, the term of this patent is extended or adjusted under 35 U.S.C. 154(b) by 141 days.

(21) Appl. No.: 10/204,726

(22) PCT Filed: Feb. 23, 2001

(86) PCT No.: PCT/US01/05850

§ 371 (c)(1),
(2), (4) Date: Dec. 10, 2002

(87) PCT Pub. No.: WO01/62479

PCT Pub. Date: Aug. 30, 2001

(65) Prior Publication Data

US 2003/0209841 A1 Nov. 13, 2003

Related U.S. Application Data

(60) Provisional application No. 60/264,916, filed on Jan. 29, 2001, provisional application No. 60/184,743, filed on Feb. 24, 2000, provisional application No. 60/184,639, filed on Feb. 24, 2000, and provisional application No. 60/184,564, filed on Feb. 24, 2000.

(51) Int. Cl.[7] .......................... B29C 45/16; B22D 22/00
(52) U.S. Cl. ...................... 264/513; 264/572; 428/35.7; 428/318.6; 428/318.8; 428/319.3
(58) Field of Search ................................ 264/513, 572, 264/328.8, 570; 425/130, 573; 428/35.7, 318.6, 318.8, 319.3

(56) References Cited

U.S. PATENT DOCUMENTS

| | | |
|---|---|---|
| 3,873,656 A | 3/1975 | Garner et al. |
| 4,025,686 A | 5/1977 | Zion |
| 5,169,648 A | 12/1992 | Eckardt et al. |
| 5,277,462 A | 1/1994 | Verzelli et al. |
| 5,387,391 A | 2/1995 | Satoh et al. |
| 5,637,328 A | 6/1997 | Shah et al. |
| 5,728,410 A * | 3/1998 | Hendry ..................... 425/130 |
| 5,855,840 A | 1/1999 | Cucheran et al. |
| 6,068,424 A | 5/2000 | Wycech |

FOREIGN PATENT DOCUMENTS

| | | |
|---|---|---|
| DE | 19703291 | 3/1998 |
| EP | 0 6285911 | 10/1994 |
| EP | 0 688 652 | 12/1995 |

(List continued on next page.)

OTHER PUBLICATIONS

Rusch K.C., Gas Assisted Injection Molding—The New Thermoplastic Molding Technology for Exterior Body panels Plastics in Automobiles. Bumper Systems, Interior Trim, Instrument Panels, and Exterior Panels. Detroit Feb. 27–Mar. 3, 1989, International Congress and Exposition, Warrendale, SAE, US, pp. 155–162.

*Primary Examiner*—Suzanne E. McDowell
(74) *Attorney, Agent, or Firm*—Banner & Witcoff, Ltd.

(57) ABSTRACT

The present invention provides processes and an apparatus for injection-molding an article with a fluid channel formed therein. The process includes providing at least first and second resin streams within a mold cavity, causing the flow fronts (16) of the resin streams to meet at a longitudinal point in the mold cavity to form a first layer of solidified resin on a peripheral surface of the mold, the first layer having a knit line (20) at the longitudinal point where the resin streams meet; and introducing a fluid into the molten resin in the mold to form a fluid channel (50) and a second layer (32) of solidified resin, the second layer between the fluid channel and the first layer of solidified resin, wherein the second layer is devoid of a knit line at the longitudinal point in the mold cavity where the first and second flow fronts meet.

22 Claims, 7 Drawing Sheets

FOREIGN PATENT DOCUMENTS

| | | |
|---|---|---|
| EP | 0 773 096 | 5/1997 |
| EP | 0 949 053 | 10/1999 |
| GB | 2 087 299 | 5/1982 |
| JP | 58 042441 | 3/1983 |
| JP | 04 293638 | 10/1992 |
| JP | 5-57741 | 3/1993 |
| JP | 06 312437 | 11/1994 |
| JP | 10 15981 | 1/1998 |
| WO | WO 98/24610 | 6/1998 |
| WO | WO 98/34771 | 8/1998 |
| WO | WO 98/39150 | 9/1998 |
| WO | WO 01/12411 | 2/2001 |

* cited by examiner

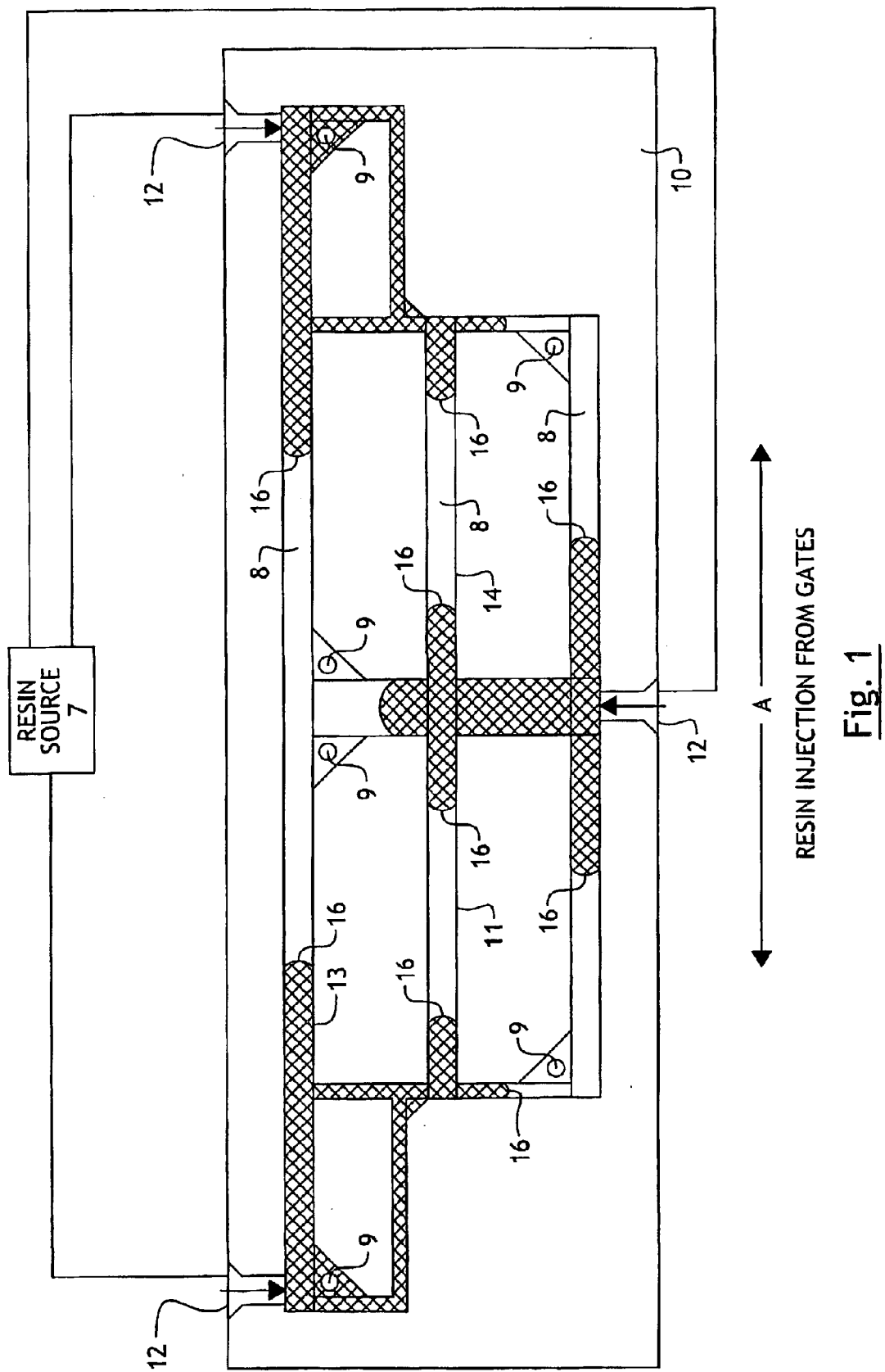

SHORT SHOT JUST PRIOR TO INJECTION OF FLUID

OVER FLOW JUST PRIOR TO INJECTION OF FLUID

INJECTION MOLDING TECHNIQUES UTILIZING FLUID CHANNELS

RELATED APPLICATIONS

Priority is claimed to provisional application Ser. No. 60/184,743, entitled "Injection Molding Techniques Utilizing Fluid Channels," No. 60/184,639, entitled "Integrated Co-Injection Molded Bumpers and Methods of Making the Same," and 60/184,564, entitled "Low-Density Injection-Molded Body Parts," which were all filed on Feb. 24, 2000, and Ser. No. 60/264,916, entitled "Multi-Part Sequential Valve Gating," which was filed Jan. 29, 2001.

FIELD OF THE INVENTION

The present invention relates to molding processes and an apparatus therefor. Specifically, the present invention relates to injection molding processes and an apparatus which provide for increased strength of injection-molded articles that contain reinforcing fibers or particles.

BACKGROUND OF THE INVENTION

Injection molding typically involves the injection of molten resin through one or more gates to create multiple flow fronts within the mold. Flow fronts are the leading interface of a resin stream flowing within the mold. Multiple flow fronts may derive from multiple gates in the mold or from multiple flow paths communicating from a single gate. As the molding process progresses, the flow fronts eventually meet one another, resulting in the formation of one or more knit lines.

In the prior art, knit lines represent areas of decreased strength in the molded article. In molding processes that utilize fiber reinforcement in the resin, fiber materials tend to align in the direction of resin flow within the mold and typically do not become oriented or meshed across knit lines. As such, the use of injection molding to produce structural articles with fiber reinforced resins has been somewhat problematic. For example, reinforcement structures in vehicles are required to have rigid crossways linking the left and right sides together and sufficient strength to support bumper fascias, grille components, headlamps, radiator, washer fluid reservoir and other components of the vehicle. Conventionally, such reinforcement structures have been made from several stamped steel components welded together or from compression-molded continuous glass mat reinforced plastic. Although it has been recognized that injection molding techniques generally result in a less-expensive and lighter-weight end product than stamped-steel constructions or compression molding, conventional injection molding has not heretofore been widely employed for creating structural articles.

U.S. Pat. Nos. 5,556,650 and 5,417,916 teach an injection system using a single injection point for a fluid to displace a first portion of the molten plastic resin from a first portion of an article-defining cavity into a secondary portion of the article-defining cavity. There are limitations in using such a system having a single molten flow front to make complex shaped articles. For example, injection of a pressurized fluid may not adequately displace molten plastic resin through complex shaped articles. Further, knit lines can develop where flow fronts meet, resulting in decreased strength and structural integrity.

To summarize, articles that require increased strength and structural integrity, such as structural polymeric articles like reinforcing members for automobiles, are difficult if not impossible to make using conventional injection molding techniques.

Accordingly, it is a primary objective of the invention to provide molding processes and apparatus for making injection molded fiber-reinforced articles of increased strength as compared to articles made by prior art techniques.

SUMMARY OF THE INVENTION

The present invention provides processes and an apparatus for injection-molding an article with a fluid channel formed therein to provide strength and structural integrity. The process includes providing a mold defining a mold cavity for a part or article, providing at least first and second resin streams within the mold cavity wherein each resin stream has a flow front, causing the flow fronts of the resin streams to meet at a longitudinal point in the mold cavity to form a first layer of solidified resin on a peripheral surface of the mold, the first layer having a knit line where the resin streams meet; and introducing a fluid into the molten resin in the mold to form a fluid channel and a second layer of solidified resin, the second layer between the fluid channel and the first layer, wherein the second layer is devoid of a knit line at the longitudinal point of the knit line in the first layer. Where desired, the fluid may be introduced and the resin may be retained within the mold, or a portion of the resin can overflow outside of the mold.

The fluid channel formed in accordance with the present invention may have a cross-section that is generally circular in shape and may extend substantially through multiple portions of the molded article. In accordance with the present invention, orientation of reinforcing fibers in the second layer of solidified resin may be in a direction that is generally transverse to the knit line in the first solidified resin layer. Further, the reinforcing fibers in the second layer of solidified resin can extend across the longitudinal point where the flow fronts meet. The formation of the second layer of solidified resin that is devoid of knit lines at the longitudinal point of the knit lines in the first layer of solidified resin results in increased enhanced structural integrity of the molded article. Further, the present invention can be used to make structural reinforcement articles, such as reinforcement members for vehicles, that could not be practically manufactured using conventional injection molding techniques.

In a preferred embodiment, a molding apparatus according to the invention includes a mold defining a mold cavity for a part or article, and at least one gate for introducing molten resin into the mold cavity. In a preferred embodiment, multiple gates can be used to introduce molten resin into the mold cavity. The mold is also provided with means for introducing a fluid, such as a compressed gas (for example, air or nitrogen) or a pressurized liquid (for example, water), into the mold cavity at an appropriate place and time. The fluid comprises a different material than the resin. Preferably, the fluid is introduced at a time when the resin that is immediately adjacent the mold cavity has begun to solidify into a first layer of solidified resin due to the cooling provided by the mold surface. The first layer of solidified resin is between the mold surface and resin near the center of the mold cavity that is still in a molten state. As a result, injection of the fluid into the mold cavity results in the displacement of the molten resin near the center of the mold cavity and the formation of a fluid channel.

Displacement of the molten resin also results in a reorientation of reinforcing fibers in the molten resin in the vicinity of the knit lines in the first layer of solidified resin, such that when that molten resin solidifies to form a second layer of solidified resin devoid of a knit line, fibers in the second layer are oriented transverse to the knit lines in the first layer. The displaced molten resin can be used to fill unfilled portions of the mold cavity to form first and second layers therein (a process that can be referred to as a "short shot" or "packing out" method) and/or the displaced resin can be displaced to an overflow chamber (a process that can be referred to as an "overflow" method). Injection of fluid may occur through nozzles in fluid communication with the mold cavity and similar to those utilized for conventional gas-assisted molding techniques.

In one of its broadest applications, the invention provides an apparatus for injection molding articles comprising a mold including at least a gate for the introduction of molten resin including reinforcing fibers, the resin traveling within the mold defining at least two flow fronts, the flow fronts meeting to form a knit line at a longitudinal point in a first layer of solidified resin, the first layer on the peripheral surface of the part being formed, and further including means for injecting a fluid into the resin within the mold to form a fluid channel in the molded article, and a second layer of solidified resin between the fluid channel and the first layer of solidified resin, the second layer devoid of a knit line at the longitudinal point of the knit line in the first layer. Preferably, reinforcing fibers in the second layer may be orientated in a direction that is substantially transverse to the knit line.

In another of its broadest applications, the invention also provides a process for injection molding articles, the process comprising the steps of: a) providing a mold defining a mold cavity; b) providing first and second resin streams within the mold cavity, each resin stream having a flow front; c) causing the flow fronts of the resin streams to meet to form a knit line at a longitudinal point in a first layer of solidified resin; and d) introducing a fluid into the resin in the mold, and e) forming a fluid channel and a second layer of solidified resin, the second layer between the fluid channel and the first layer, the second layer devoid of a knit line at the longitudinal point of the first layer.

Co-injection of two or more different molten resins can also be used in accordance with the present invention to form different first and/or second solidified resin layers at different portions of a part as may be desired. More specifically, co-injection of two or more different molten resins can be performed at the same or different gate locations and/or a different times as may be desired.

A primary advantage provided by the invention is increased strength of molded articles, especially at the longitudinal point of knit lines, by forming a second layer devoid of a knit line at that longitudinal point of knit lines in the first layer. Thus, articles molded according to the invention will typically have greater strength and structural integrity than articles molded according to conventional techniques. Moreover, articles that require increased strength and structural integrity, such as structural polymeric articles for vehicles, may formed in accordance with the present invention that could mot be made using conventional injection molding techniques.

BRIEF DESCRIPTION OF THE DRAWINGS

The accompanying drawings which are incorporated into and form a part of the specification, illustrate preferred embodiments of the present invention and, together with the description, serve to explain the principles of the invention. The drawings are only for the purpose of illustrating a preferred embodiment of the invention and are not to be construed as limiting the invention. In the drawings, in which like numbers refer to like parts throughout:

FIG. 1 is an illustration of a section taken along a mold centerline and illustrating a process and apparatus for molding an article according to a preferred embodiment of the invention, showing the introduction of molten resin into the mold;

DESCRIPTION OF THE PREFERRED EMBODIMENTS

Figure 2A:
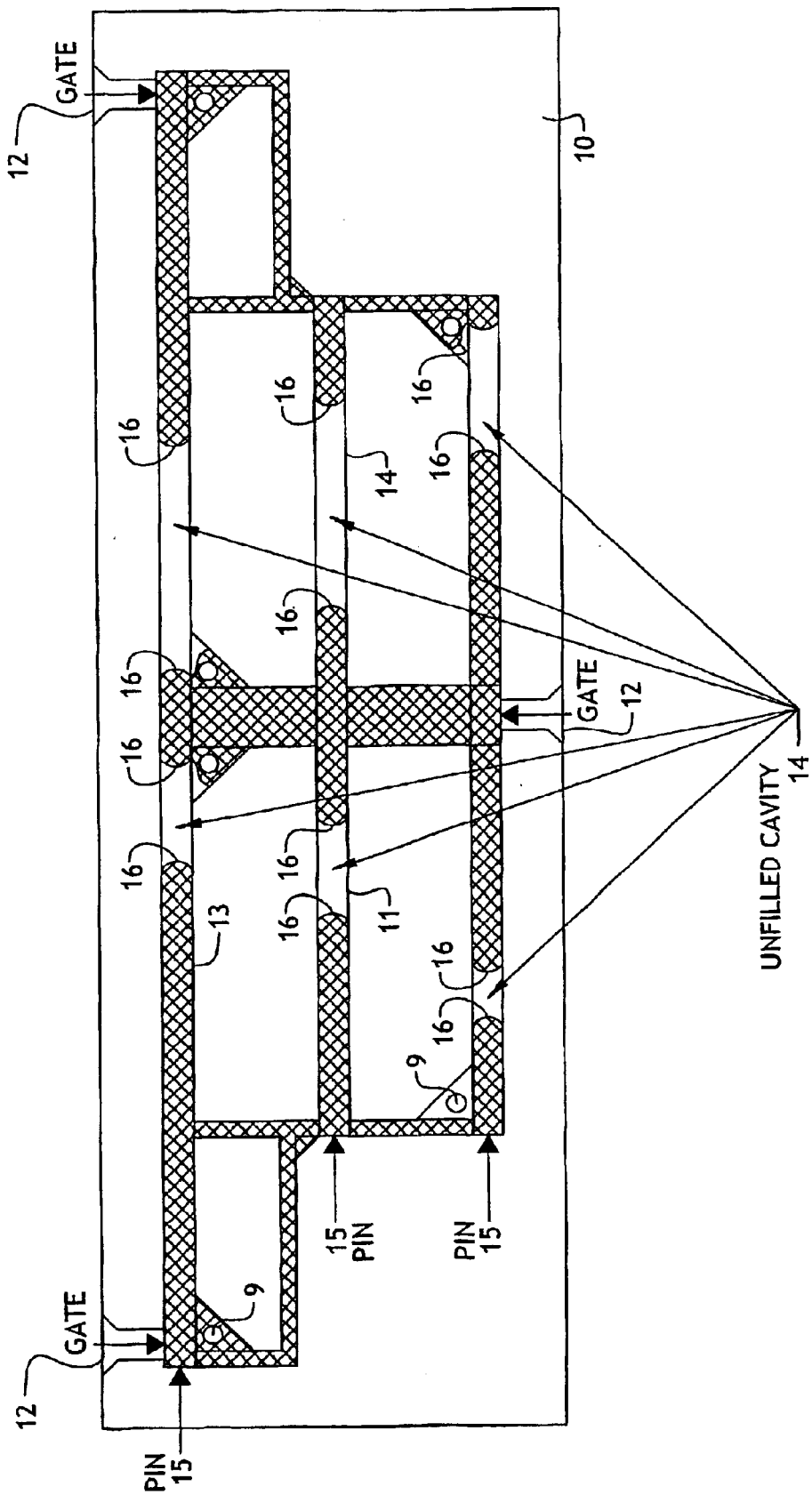
FIG. 2A is an illustration of a section taken along a mold centerline and illustrating a process and apparatus for molding an article according to a preferred embodiment of the invention, that is, a preferred "short shot" method, showing unfilled cavities prior to fluid injection.

FIG. 1 is a section taken along a mold centerline so as to reveal the back half of the mold 10 and the back half 11 of the mold cavity 14. The exemplary mold 10 is for a reinforcement member in a vehicle which includes a number of cross-members, associated with cross-member mold cavities 8 of mold cavity 14 which extend in a cross-vehicle direction, i.e., in a direction transverse to the plane of the driver and passenger doors of the vehicle. The reinforcement member made in accordance with the present invention can support a wide variety of components in a vehicle, including but not limited to bumper fascias, battery, grille components, headlamps, radiator, washer fluid reservoir and other components of a vehicle. Generally, in the case of such reinforcement members, it is desirable to provide the greatest structural strength in the cross-vehicle direction, which is generally indicated by the arrow (A). This is because the molded reinforcement member is typically utilized to support a number of components of the vehicle, including the battery, windshield fluid reservoirs, headlights, etc. The reinforcing member is also provided with a number of through holes associated with through hole projections 9 for mounting to the vehicle. It will be recognized by those of ordinary skill that the illustrated reinforcement is merely exemplary and it will be recognized that the invention finds broad application to the molding of many other structural articles.

Mold 10 includes a number of gates 12 for introducing molten resin 13 from a resin source 7 into the mold cavity 14. As can be seen, as molten resin is introduced into the mold through gates 12, a number of flow fronts 16 are formed as the resin streams progress within the mold cavity 14. While multiple gates 12 are shown, a single gate 12 can be sued and still obtain multiple flow fronts 16 as the resin flows through the cavity 14. Typically, the molten resin will comprise reinforcing fibers, such as glass and/or carbon fibers, or reinforcing particles, such as nanoparticles (for example, nanoparticles comprising smectite clay), for increasing the structural strength of the molded article. The resin can be any suitable resin, including but not limited to polypropylene, polyethylene, and/or acrylonitrile butadiene styrene (ABS).

FIG. 2A is an illustration of a section taken along a mold centerline and illustrating a process and apparatus for molding an article according to a preferred embodiment of the invention, that is, a preferred "short shot" method, showing unfilled cavities prior to fluid injection. After fluid injection, knit lines (not shown) are formed as the molten resin continues to flow within the mold cavity 14 and the flow fronts 16 collide. As will be recognized by those of ordinary skill, the knit lines represent areas of weakened structural strength in articles molded according to prior art techniques. Thus, the flow rates of the molten resin into the gates 12 and the location of the gates 12 are selected so that knit lines are formed in areas of the molded article which are less likely to be subject to large forces. Further, as shown in FIG. 4, after fluid injection, the knit lines are formed in a first layer 30 of solidified resin, but not in second layer 32 of solidified resin, thereby providing increased strength across knit lines 20.

Figure 2B:
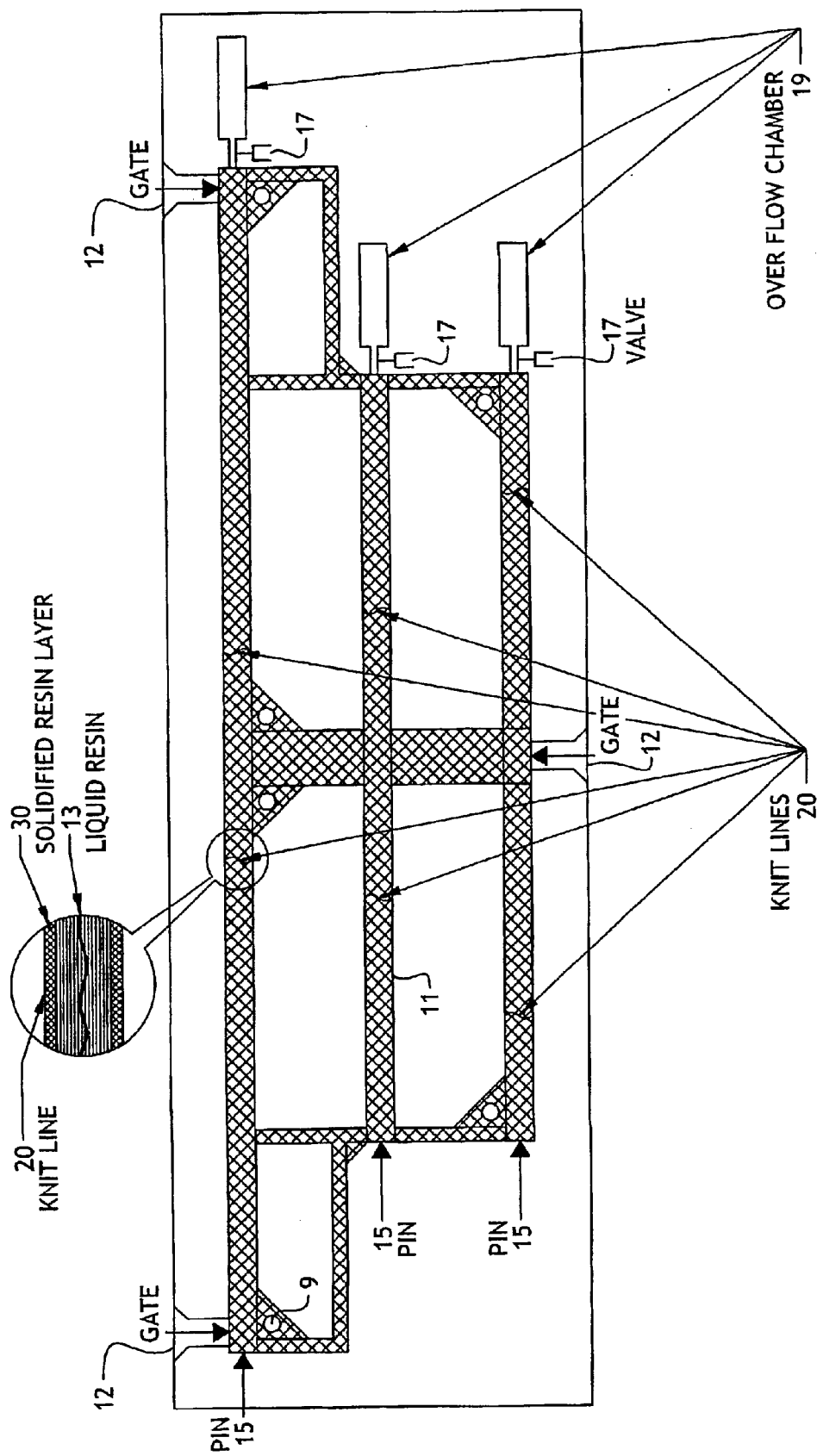
FIG. 2B is an illustration of a section taken along a mold centerline and illustrating a process and apparatus for molding an article according to another preferred embodiment of the invention, that is, a preferred "overflow" method, showing the formation of knit lines in a solidified outerlayer, and no knit lines in a liquid resin inner layer prior to fluid injection.

FIG. 2B is an illustration of a section taken along a mold centerline and illustrating a process and apparatus for molding an article according to another preferred embodiment of the invention, that is, a preferred "overflow" method, showing the formation of knit lines in a solidified outerlayer, and no knit lines in a liquid resin inner layer prior to fluid injection. Further, as shown in FIG. 4, after fluid injection, the knit lines are formed in a first layer 30 of solidified resin, but not in second layer 32 of solidified resin, thereby providing increased strength across knit lines 20.

Figure 3:
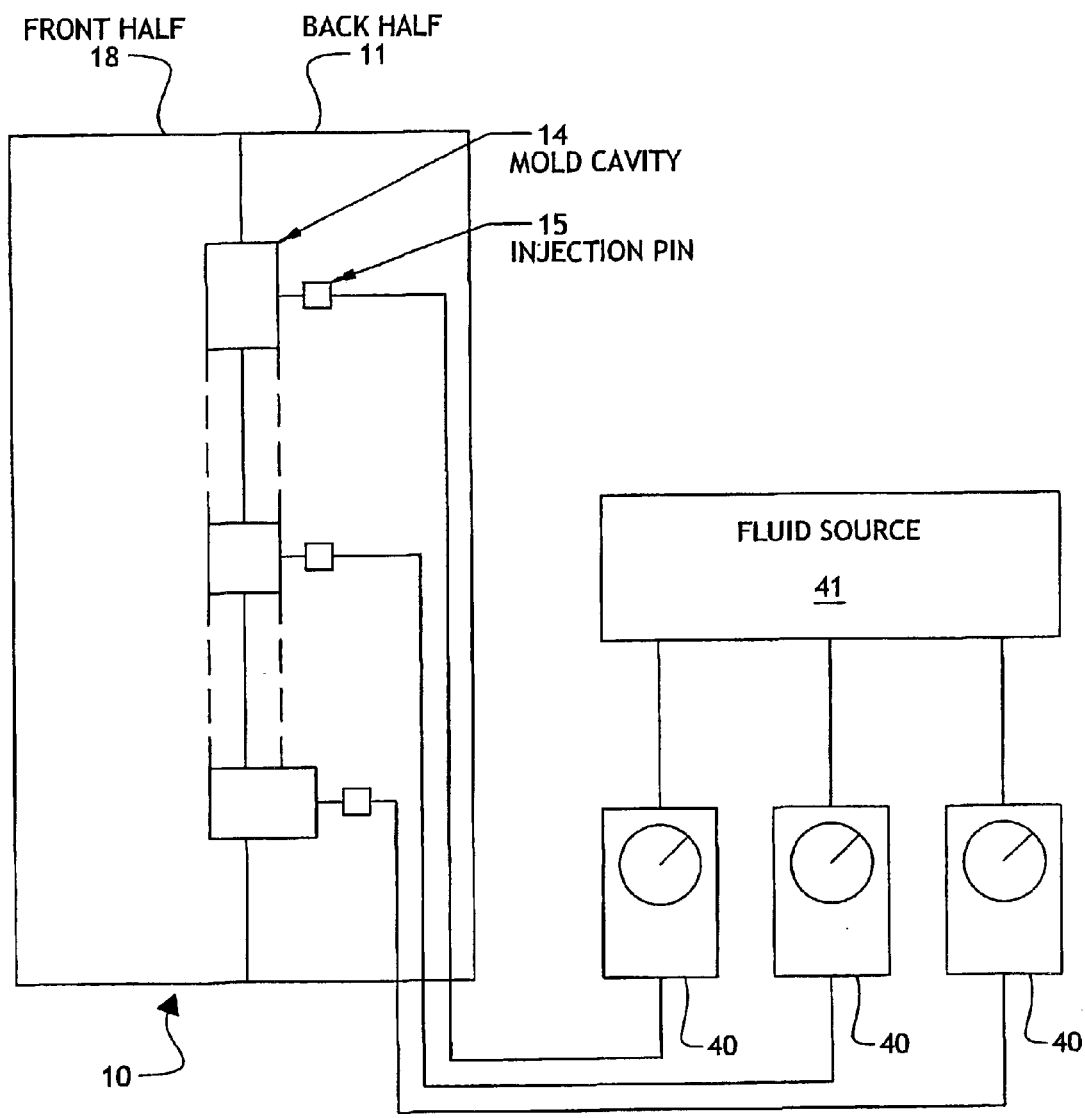
FIG. 3 is an illustration of a section taken along a side view and illustrating a process and apparatus for molding an article according to a preferred embodiment of the invention, showing a fluid injection apparatus for forming of a fluid channel.

FIG. 3 is an illustration of a section taken along a side view and illustrating a process and apparatus for molding an article according to a preferred embodiment of the invention, showing a fluid injection apparatus for forming of at least one fluid channel. The front half 18 and the back half 11 of the mold 10 meet together to form the mold cavity 14. A fluid injection pin(s) 15 permits fluid injection at the appropriate time to form the desired fluid channel 50 as shown in FIG. 4. A fluid injection control unit 40 is coupled to each fluid injection pin 15 and provide control of the fluid from fluid source 41 so that the desired fluid channels 50 are achieved.

Figure 4:
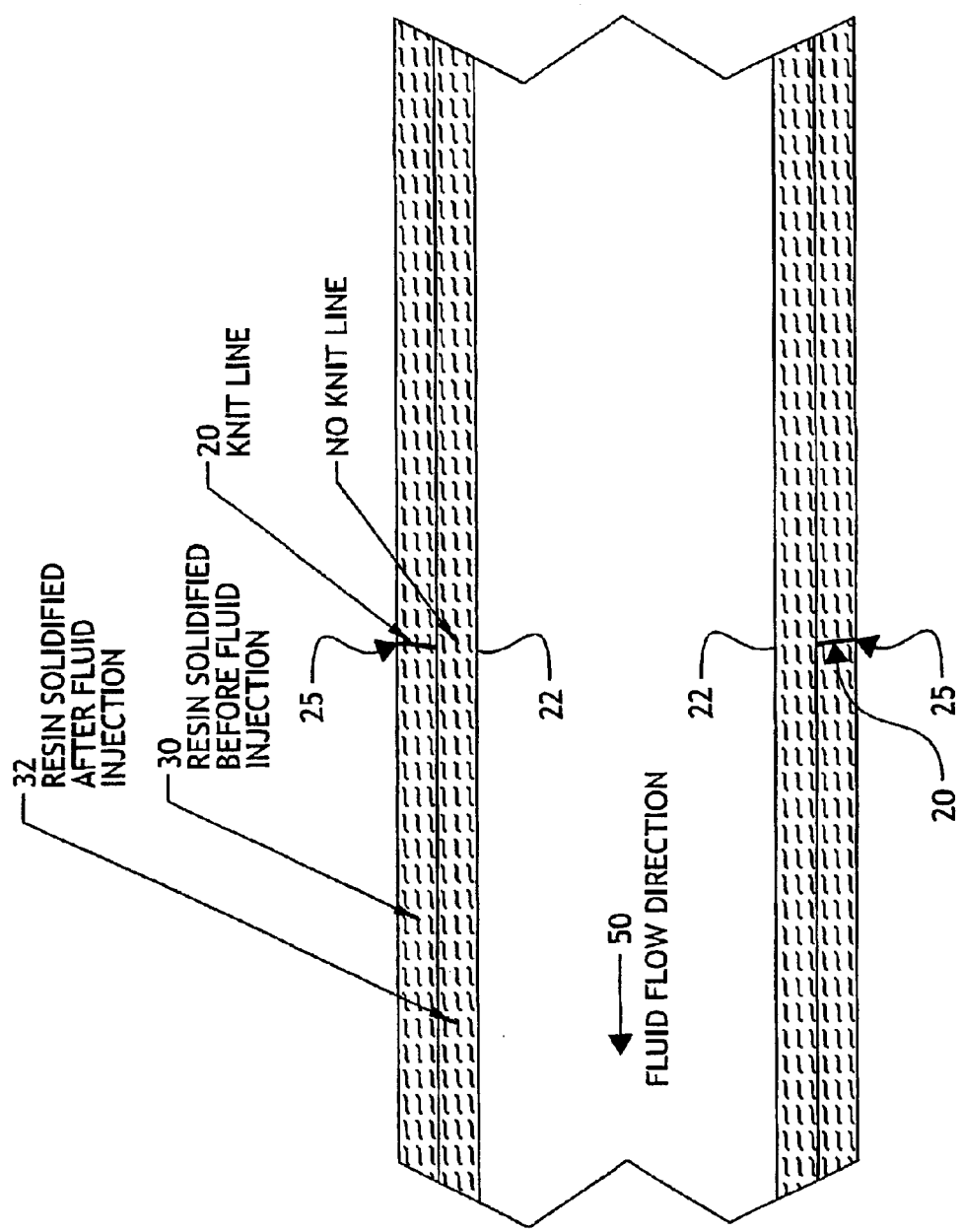
FIG. 4 is a magnified view of a fluid channel 50 formed by the process and apparatus illustrated in FIGS. 1 through 3.

Referring to FIG. 4, in accordance with an aspect of the invention, the molded article is formed with one or more fluid channels 50 extending substantially through the cross-member cavities 8 of the molded structure and across the knit lines 20. As will be appreciated by those of ordinary skill in the art, the fluid channel 50 forms a very strong fiber-reinforced tube within the molded article. Moreover, as illustrated in FIG. 4, the reinforcing fibers 22 extend across the knit lines 20, thereby strengthening the molded article at the knit line interface.

The formation of fluid channels 50 according to the invention, are accomplished by the use of one or more nozzles provided at or near one end of cross member cavities 8, for injecting fluid into the molten resin 13. Such nozzles are preferably of such a diameter or lateral dimension that their presence does not significantly impact the structural strength of the molded article. Moreover, such nozzles may be provided as retractable elements which may be retracted before the entire quantity of resin within the mold is cured, thereby providing for some molten resin to migrate into the hole left by the nozzle.

It will be understood that the injection of fluid should occur at a time that is late enough in the molding process that the peripheral surface of the molten resin has solidified or become semi-solid due to cooling by contact with the mold to form a first layer 30 before fluid injection, yet early enough in the molding process that the center of the resin stream remains in a molten state. Introduction of fluid results in displacement of the molten resin in a generally longitudinal direction and across the knit line to form a second layer 32 of solidified molten resin after fluid injection.

Figure 5:
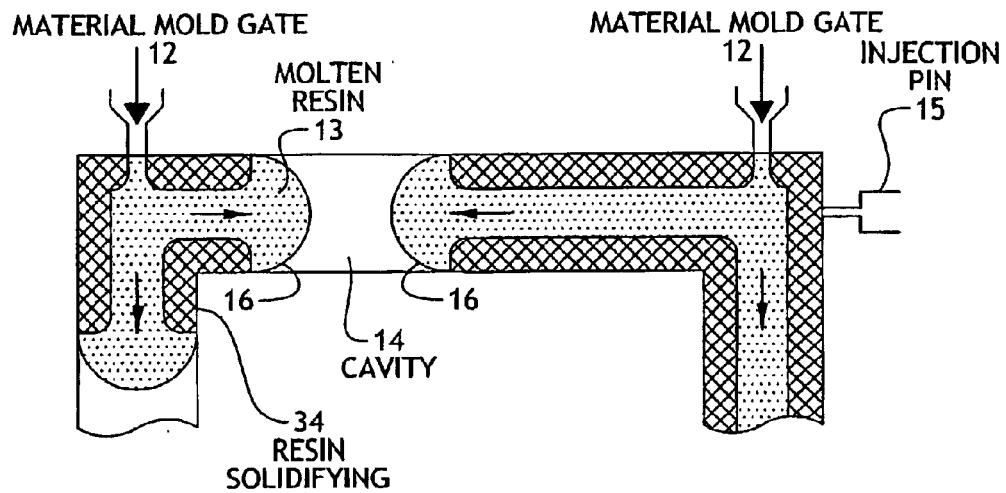
FIGS. 5–7 and 8–10 illustrate a process and apparatus for molding an article using a "packing out" or "short shot" method and an "overflow" method, respectively.
Figure 6:
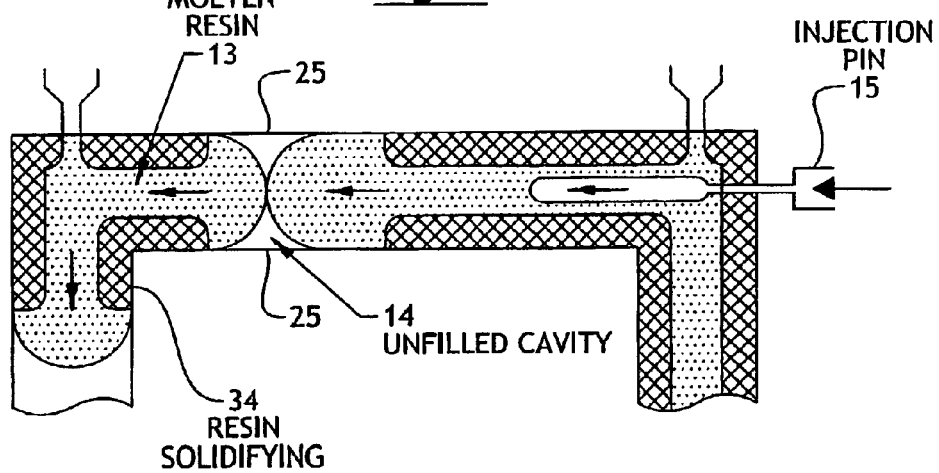

As can be seen in FIG. 4, which is a magnified view of the fluid channel 50 formed by the apparatus and method shown in FIGS. 1-3, the peripheral layer or first layer 30 of solidified resin has solidified with knit line 20. The knit line 20 is a weakened area because the resin began to solidify at the surface of the flow fronts before meeting, resulting in weak fusion. The fibers 22 also do not cross the knit line 20 in first layer 30. During the fluid injection stage, the fluid displaces resin that has not solidified, that is molten resin 13 in central portion 52 (shown in FIGS. 7 and 10), through mold cavity 14. As shown in the embodiment depicted in FIGS. 5–7, during the fluid injection stage the displaced molten resin 13 continues to form a first layer 30 along the mold surface, and to form a second layer 32 inside the peripheral layer or first layer 30 of solidified resin, wherein the second layer 32 is devoid of a knit line. As shown in the embodiment depicted in FIGS. 8–10, during the fluid injection stage, displaced molten resin overflows to an overflow chamber 19, while molten resin remaining the mold cavity forms second layer 32 inside the peripheral layers or first layer 30 of solidified resin, wherein the second layer 32 is devoid of a knit line. The invention therefore provides for increased strength in the vicinity of the knit lines 20 in the first layer 30 of solidified resin.

Figure 7:
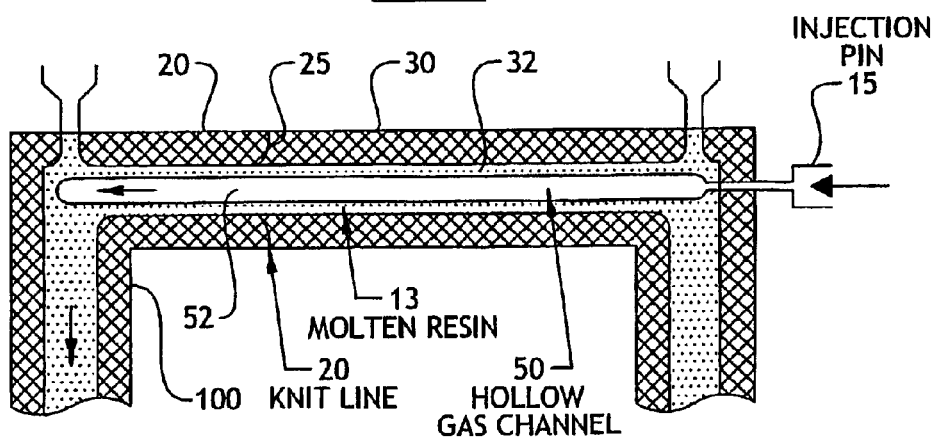
Figure 8:
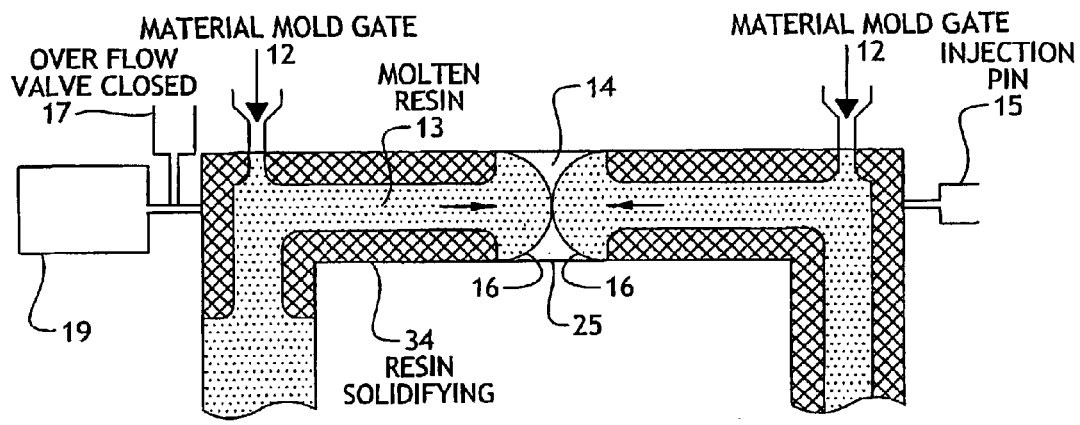
Figure 9:
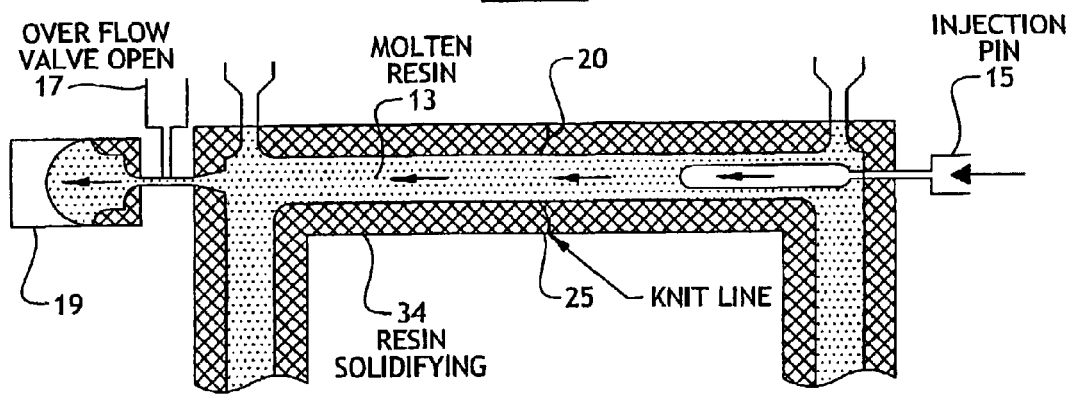

Injection of fluid to form a fluid channel in the mold may be accomplished according to a "short shot" or "packing out" method as shown in FIGS. 2A and 5–7, or alternatively, according to an "overflow method" as shown in FIGS. 2B and 8–10. In the "packing out" method illustrated in FIGS. 5–7, as the molten resin 13 flows from the material mold gate 12, portions 34 of the resin begin to solidify to form first layer 30. As the molten resin 13 continues to flow into the mold cavity, more of the unfilled cavity 14 is filled. As the desired time, fluid is injected via the fluid injection pin 15, forcing the molten resin 13 toward the outside walls of the mold such that a fluid channel 50 is formed in the central portion 52 of the mold cavity 14 and a knit line 20 is formed at a longitudinal point 25 in the mold cavity 14 where the flow front 16 meet. The remaining molten resin 13 then solidifies to form second layer 32 of solidified resin. As shown in FIG. 7, second layer 32 is devoid of a knit line. Part 100, which is formed according to this embodiment, thus has a second layer 32 of solidified resin devoid of a knit line in the vicinity of knit line 20 in first layer 30. Part 100 has increased strength and structural integrity due to the second layer 32 devoid of knit lines in the vicinity of knit line 20 in first layer 30.

Figure 10:
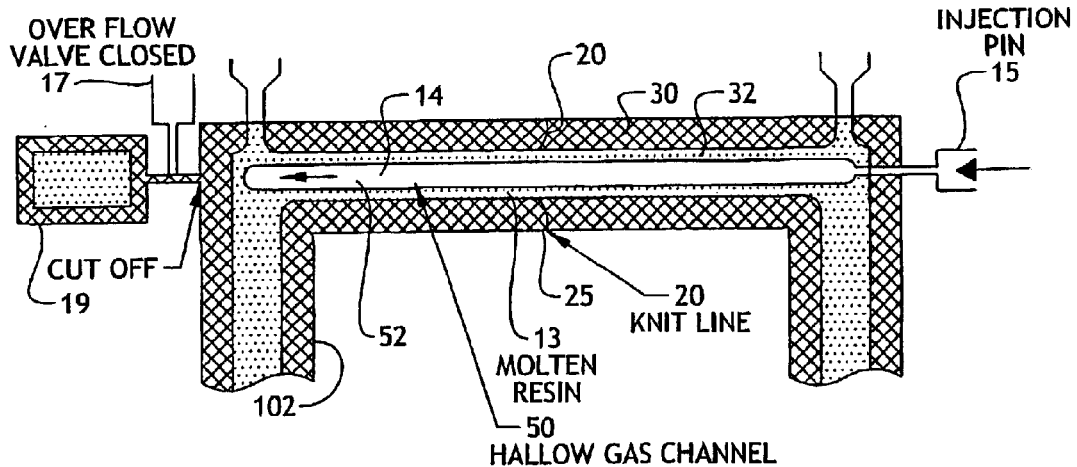

In the "overflow" method shown in FIGS. 2B and 8–10, while the overflow valve 17 is closed, the molten resin 13 is inserted through the material mold gates 12. At a predetermined time when the molten resin has filled a substantial portion of the mold cavity, the overflow valve 17 is opened and fluid is injected via an injection pin(s) 15 to form the desired fluid channel 50 substantially in the central portion of the molded component. The injected fluid displaces some molten resin 13 out of mold cavity 14 through overflow valve 17 and into overflow chamber 19. Upon formation of the desired fluid channel 50, the resin adjacent to the walls of the mold has solidified in first layer 9300 and has formed a knit line 20 at longitudinal point 25 in mold cavity 14 where flow fronts 16 meet, and the overflow valve 17 is closed. The remaining molten resin then solidifies to form second layer 32 of solidified resin. As shown in FIG. 10, second layer 32 is devoid of a knit line. Part 102, which is formed according to this embodiment, thus has a second layer 32 of solidified resin devoid of a knit line in the vicinity of knit line 20 in first layer 30. Part 102 has increased strength and structural integrity due to the second layer 32 devoid of knit lines in the vicinity of knit line 20 in first layer 30. If desired, overflow chamber 19 can be grabbed by grabbers (not shown) to remove the part 102 from the mold. Overflow chamber 19 can be removed from part 102 using any suitable method, such as pulling off overflow holder 19 or trimming overflow chamber 19 from part 102.

As previously noted, the fluid can be either a compressed gas or a pressurized liquid. Liquids, such as water, cool and solidify the molten resin faster than a gas, thereby providing for shorter cycle time to form a part. Further, a liquid, such as water, is heavier than a gas, and thus can more easily form a fluid channel in molten resin than a gas. Thus, a liquid can form larger diameter and longer fluid channels in a molten resin than a gas. After the second layer 32 has solidified, the fluid can be retained or expelled from the fluid channel as may be desired.

Co-injection of multiple resin materials at the same or different gates can be used in accordance with the present invention. Thus, if desired, the first layer 30 can comprise a different resin or resin mixture than the second layer 32. In addition, co-injection of multiple resin materials at the same or different times at the same or different gates can be used in accordance with the present invention to obtain first layers 30 comprising a certain resin mixture at certain portions of a part, as well as obtaining second layers 32 comprising a certain resin or resin mixtures at certain portions of a part as may be desired. In addition, the present invention can include sequential valve gating as taught in U.S. Pat. No. 5,762,855, which is incorporated herein by reference.

The fluid(s) used to form the fluid channels in accordance with the present invention can be allowed to exit the fluid channels after the first and second layers of solidified resins have been formed. For example, pressure exerted on a compressed gas used to form a fluid channel can be released. A pressurized liquid can be simply be drained from the fluid channel.

Although the preferred embodiments of this invention have been described hereinabove in some detail, it should be appreciated that a variety of embodiments will be readily available to persons utilizing the invention for a specific end use. The description of this invention is not intended to be limiting on this invention, but is merely illustrative of the preferred embodiment of this invention. Other products, apparatus and methods which incorporate modifications or changes to that which has been described herein are equally included within this application. Additional objects, features and advantages of the present invention will become apparent by referring to the above description of the invention in connection with the accompanying drawings.

What is claimed is:

1. A process for injection-molding an article with a fluid channel formed therein to provide strength and structural integrity, comprising the steps of:
   providing a mold defining a mold cavity;
   providing at least first and second molten resin streams within the mold cavity wherein each resin stream has a flow front;
   causing the flow fronts of the resin streams to meet at a longitudinal point in the mold cavity and form a first layer of solidified resin on the peripheral surface of the mold, the first layer having at least one knit line at the longitudinal point where the resin fronts meet; and
   introducing a fluid into either or both of the molten resin streams in the mold to form a fluid channel and a second layer, the second layer between the first layer and the fluid channel, the second layer devoid of a knit line at the longitudinal point where the resin fronts 15 meet.

2. The process of claim 1 wherein the resin streams comprise reinforcing fibers.

3. The process of claim 2 wherein the reinforcing fibers include glass fibers.

4. The process of claim 2 wherein the reinforcing fibers include carbon fibers.

5. The process of claim 1 wherein the resin streams comprise reinforcing particles.

6. The process of claim 5 wherein the reinforcing particles comprise nanoparticles.

7. The process of claim 6 wherein the nanoparticles comprise smectite clay.

8. The process of claim 1 wherein the fluid is a compressed gas.

9. The process of claim 1 wherein the fluid is a pressurized liquid.

10. The process of claim 9 wherein the pressurized liquid is water.

11. The process of claim 1 wherein the second layer has reinforcing fibers oriented transverse to the knit line in the first layer and across the longitudinal point in the mold cavity where the flow fronts meet.

12. An article formed using the process of claim 1.

13. The article of claim 12 wherein the article is a reinforcing member to support a vehicle component in a vehicle component in a vehicle.

14. The process of claim 1 wherein introducing the fluid is performed while the resin is maintained within the mold cavity.

15. The process of claim 1 wherein introducing the fluid is performed while some molten resin is allowed to exit the mold cavity as fluid is introduced into the mold.

16. The process of claim 1 wherein the first molten resin stream and the second molten resin stream are injected into the mold cavity at the same location, the flow fronts of the resin streams meeting at a longitudinal point in the mold cavity different than from the location of injection of the first and second molten resin streams.

17. The process of claim 1 wherein the first molten resin stream is injected into the mold cavity a first location, and the second molten stream is injected into the mold cavity at a second location, the first location being different than the second location.

18. The process of claim 1 wherein the first molten resin stream or the second molten resin stream, or both, comprise co-injected resins.

19. The process of claim 1 wherein the first molten resin stream and the second molten resin stream are injected into the mold cavity at different gate locations around the mold cavity.

20. The process of claim 1 wherein the first molten resin stream and the second molten resin stream are injected into the mold cavity at different gate locations around the mold cavity and using sequential valve gating.

21. An article formed using an apparatus for injection-molding the article with a fluid channel formed therein to provide strength and structural integrity, the apparatus comprising:

a mold having a mold cavity with at least one mold gate for inserting molten resin into the mold, the mold further comprising at least one fluid injection pin coupled to a fluid injection control unit having a fluid source, wherein the molten resin is inserted into the at least one mold gate to provide at least first and second resin streams within the mold cavity, each resin stream having a flow front such that when the flow fronts of the resin streams meet, a first layer of solidified resin is formed on a peripheral surface of the mold, and a knit line is formed in the first layer at a longitudinal point in the mold cavity where the flow fronts meet; and wherein a fluid is injected into the molten resin in the mold in a timely manner to form a fluid channel and a second layer of solidified resin, the second layer between the fluid channel and the first layer, wherein the second layer is devoid of a knit line at the longitudinal point where the flow fronts meet, wherein the second layer has reinforcing fibers oriented transverse to the knit line in the first layer and across the longitudinal point in the mold cavity where the flow fronts meet.

22. The article of claim 21 wherein the article is a reinforcing member to support a vehicle component in a vehicle.

* * * * *